Patented Aug. 6, 1929.

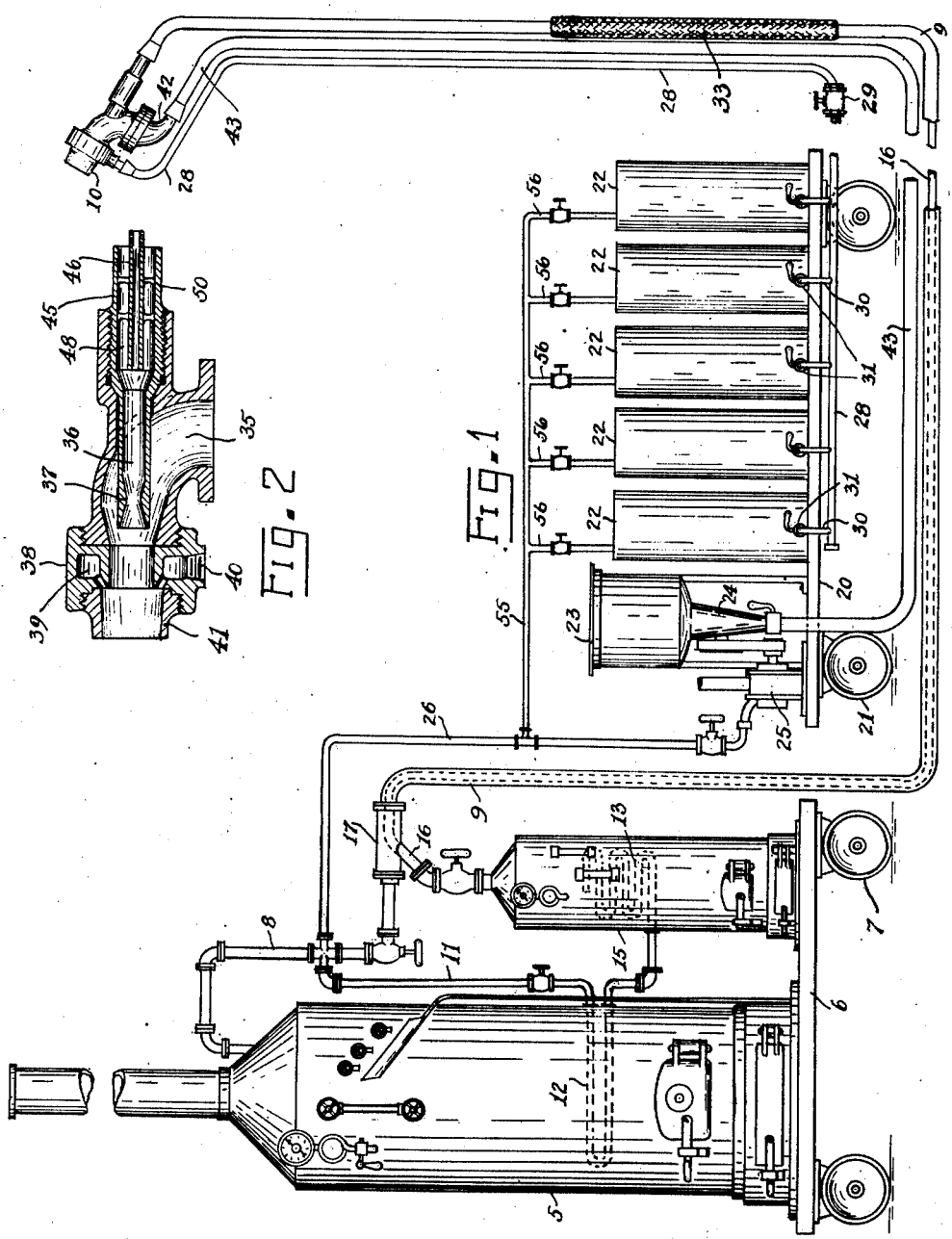

1,723,955

UNITED STATES PATENT OFFICE.

JOHN E. SHEPHERD AND EDWIN K. O'BRIEN, OF CHARLOTTESVILLE, VIRGINIA, ASSIGNORS, BY MESNE ASSIGNMENTS, TO BELLE MEAD DEVELOPMENT CORPORATION, OF CHARLOTTESVILLE, VIRGINIA, A CORPORATION OF DELAWARE.

APPARATUS AND METHOD FOR AGRICULTURAL SPRAYING.

Application filed December 1, 1923. Serial No. 677,964.

This invention relates to methods and apparatus or devices for treating or spraying trees and vegetation and for removing or preventing insects and other pests, though it is noted that the invention is not limited to fighting pests nor in some respects even to treating vegetation.

One object of the invention is to provide a method and an apparatus of this kind in which a blast of steam is used as an atomizer and carrier for insecticides, oils, sulfur, fertilizers and other substances, used singly, or two or more in combination simultaneously or successively.

Another object of the invention is to provide a method and an apparatus of this kind in which the steam acts upon the oil or sulfur or other substances to effect changes in these conducive to their efficiency, and also in which the heat of the steam acts to kill pests and the force of the steam to dislodge them.

Another object of the invention is to provide a method and apparatus of this kind permitting the easy treatment of all sides of foliage and easy treatment of large areas, and quick change from one form of treatment to another.

Another object is to provide an apparatus and method for forming a spraying mist by a combination of steam and oil.

Other objects of the invention are to improve generally the simplicity, efficiency and economy of such methods and to provide a device or apparatus of this kind which is durable, economical to manufacture and operate and which will not get out of order.

Still other objects of the invention will appear as the description proceeds; and while herein details of the invention are described, the invention is not limited to these since many and various changes may be made without departing from the scope of the invention as claimed.

The inventive features for the accomplishment of these and other objects are shown herein in connection with novel methods and processes performed by an improved spraying apparatus which, briefly stated, comprises a portable boiler and an oil retort provided with conduits one within the other connecting the boiler and retort with a nozzle for at will directing a blast of steam or a blast of steam and oil mixed. Means including a main tube and valved branches and a plurality of containers for insecticides, oils, fertilizer and flowers of sulfur and the like are adapted for at will introducing these substances into said blast singly or successively or in simultaneous combination. A handle on said conduit is used by the operator for directing said blast to or above or to the windward side of leaves, bark or roots of plants, or to other objects, or into the holes or nests of small animals.

Methods for the accomplishment of the above stated objects are possible with said apparatus, the apparatus being adapted for directing a blast of steam by said nozzle, thereby to form a hot impact zone close to the nozzle for scalding moths and dislodging their nests. The cool zone remote from the nozzle is suitable for spraying the leaves and branches. The operator may at will introduce into said nozzle and blast, singly or successively or in simultaneous combination, insecticides, oils, flowers of sulfur, and other solids, or fertilizer, and the blast may be directed to, or above, or to the windward side of the leaves, bark or roots of plants or trees, or to other objects.

In the accompanying drawing, showing by way of example, one of many possible embodiments of the invention, Fig. 1 is a diagrammatic side elevation showing the apparatus as a whole; and Fig. 2 is a longitudinal sectional view of the nozzle.

Referring more particularly to Fig. 1, the apparatus is shown as comprising a portable boiler 5 heated by oil or other fuel mounted on a platform 6 having wheels 7. Said boiler is provided with a valved pipe 8 and an armored conduit 9 connecting the boiler with the nozzle 10 for directing the blast of steam. A valved superheating steam pipe 11 passes from the pipe 8 and is provided with heat receiving superheating coils 12 above the fire box of the boiler 5 and also with heating coils 13 located in and discharging into an oil retort or vaporizer 15 on the platform 6, the vaporizer having an outlet tube 16 passing through a connection 17 into and concentric with the conduit 9 and thence to the nozzle 10. The charge in the retort 15, for instance oil or sulfur, may be heated by the coil 13 or fire in its own fire box or both, as desired.

A vehicle 20, mounted on wheels 21 carries containers 22 for poisons, insecticides, oils, fertilizer and the like, and a container 23 for flowers of sulfur and other dry substances. The container 23 is provided with feeding means 24, turbine 25 and steam pipe 26 similar to that shown in the copending application of John E. Shepherd, Serial No. 649,634, filed July 5, 1923, which issued on October 6, 1925 as Patent No. 1,556,252.

If desirable, the boiler and containers may be mounted in any other manner than on wheels, for example on skids, and may rest when not employed as a spraying machine on a stationary platform and, while there, be available for other uses on a farm. For example without an engine being attached, it can be used to cook cattle feed, wash milk cans and bottles, wash and disinfect dairy barns and stalls, with the use of a great deal less water than any other means will permit, water in quantity being frequently a scarce and costly element on a farm or in an orchard. With an engine attached, the boiler is rendered available for many other power uses, such as feed cutting and grinding, wood sawing, pumping, and running dynamos for lights. Thus the spraying machine as herein described has many additional advantages and uses that no other apparatus for spray use alone has; and thus greatly reduces the general power cost to the user of apparatus of which spraying is only one use. In the large majority of cases, the apparatus will consist of an oil burning boiler 5, and one open tank 22 with a simple type of ejector nozzle 10, the spray material being conveyed to the nozzle 10 by the vacuum created by it and not under pressure as supplied by the pipes 55 and 56. These may be mounted on one platform built on skids, the entire equipment being easily shoved into an ordinary wagon body.

A main induction tube 28 provided with a valve 29 is connected by branches 30, having valves 31, with said containers and leads to the nozzle 10, whereby said tube may, at the will of the operator, introduce into said blast singly or successively or in simultaneous combination the various substances in the containers. The handle 33 formed on said conduit 9 serves for directing said blast to any point desired.

The nozzle comprises an elbow chamber 35 receiving the steam nozzle tube 36 of interior Venturi form as at 37. The collar 38 mounted on the discharge end of the chamber is provided with an angular passage 39 having a lateral opening 40 into which the pips 28 leads. The main nozzle comprises a short nozzle tube 41 mounted on the forward part of the collar 38. A connection 42 (Fig. 1) connects the rear of the chamber 35 with the tube 43 from the feed means 24.

The rear of the tube 36 is widened as at 45 to receive therein a nozzle tube 46. connected to the tube 16 from the oil vaporizer. The conduit 9 is secured over the widened part 45. The tube 46 is enough smaller than said widened part to give a steam passage 48 and is held in place by connecting members 50.

Some or all of the tanks 22 may be connected by pipes 8, 26 and 55 and valved branches 56 with the boiler, whereby steam pressure upon the liquid in the tanks greatly facilitates the flow of the liquid to the nozzle though this is not necessary, since the injector action of the nozzle is sufficient in itself to draw liquids from the tank to heights considerably above the tanks.

The present invention is an improvement in well known methods of spraying vegetation against vermin or insects of all kinds and destructive bacterial pests in that it creates greater economy in labor and materials and reduces the number of spraying applications and at the same time makes it easy to instantly create different desired spraying compounds. For instance, if a tree is being sprayed for a fungus growth on the leaves and a nest of the coddling moth or the gypsy moth be encountered, the apparatus may be immediately made available to scald the moths and destroy the nests and it can again be immediately altered to continue on with the fungus treatment or any other treatment that may be locally needed during the operation. With a number of kinds of insecticides or fungicides under the command of the operator, the spray contents may be instantaneously altered in proportion and character as the various conditions are encountered in a single tree.

Another advantage of the apparatus lies in the fact that the various fungicides which deteriorate in ready made form to an extent that renders them useless may be kept with the various constituents separate and unmixed to be mixed only at the instant of application while in transit from the nozzle. In this way virtually new pest fighting compounds may be formed, which would otherwise become useless were they left standing mixed any length of time before use.

Another advantage of the device is that it is possible to make dry and wet applications of insecticides and the like at one operation.

In following our method of spraying the danger to life and health, in the use of a poison is reduced to a minimum by reason of the ability of the operator to so control the materials as to quantity and mixture at the desired points of application that an unnecessary amount of poison is not discharged into the atmosphere, as is the case with the present dusting machines, airplanes and the like. With our new apparatus dry elements such as calcium arsenite for example in fighting boll weevil, can be sufficiently dampened by steam to be sprayed in the day time and settle on or adhere to the plant to be dissolved in the dew to follow at night.

Day time spraying with liquid spray is bad practice, due to wetting and consequent burning of the plants, but is the only method possible with other forms of spray machines. This is not true of the present apparatus, as the steam does not give enough moisture to cause burning but does allow enough to cause the calcium arsenite to adhere. Night spraying is wasteful and very dangerous process as now practiced, especially with the dusting machines but is the almost universal practice due to the fact that wetting the plant in the day time, with other than an extremely fine mist, such as is only possible with our steam spray, applies so much moisture that burning of the plant from the sun's rays results. Therefore the custom has come to be to dry-dust the spray material on to the dew at night, from some form of dusting machine or airplane, resulting in great waste of material, and danger to health and even life from the floating dust.

Another distinct advantage of the device is that it is available for the direct and economical application of fertilizers to the roots of the plants, thereby obviating the heretofore uneconomical practice of broadcasting fertilizers. It will be seen that the device makes a unitary agricultural instrument since it may be in one operation instantly utilized for nourishing the plants or destroying enemies to plant life, according to the substance used at the instant.

The poisons or fertilizer are mixed in transit in the blast of steam and the steam rapidly expands from the nozzle and due to its high velocity causes an intimate mixture of the ingredients.

In the case of dormant sprays, such as are usually applied in winter for San José scale to the limbs of the tree in the form of an emulsified neutral oil, it is possible with our apparatus to bring the oil in its substantially pure state to the jet and due to the very high velocity and expansive action of the steam, and probably to the catalytic action of the hot steam, the oil becomes so very finely emulsified that a very small quantity covers a very great area of tree surface, thereby effecting a great saving in the spraying compound.

The apparatus being portable may be carried through the rows of trees or plants and the conduit 9 being flexible and detachable permits the containers to be moved for refilling and spraying without always moving the boiler. It is noted, however, that the invention is not limited to the separate mounting of the boiler from the containers.

As the steam, after having left the nozzle has a high velocity and expands freely in atmosphere, it rapidly loses its heat and is distributed into the atmosphere in the form of a fine water mist highly colloidal in its structure and sufficiently cool to do no harm to vegetation. In actual tests with a 2 H. P. boiler under steam pressure ranging from 60 to 100 pounds per square inch, it is possible to hold the naked hand in the steam issuing from the nozzle about a foot and one-half from the nozzle, as the temperature at this point was not above 90 degrees. At a distance of two to three feet from the nozzle the steam vapor is at atmospheric temperature and cannot harm vegetation in any way. It is this peculiarity that permits of the use of the device for the various sprays as desired and at the same time permits, for instance, the use of the device for scalding nesting vermin such as coddling moths and the gypsy moths, and it is merely necessary whenever these are encountered, to cut off the fungicides, and let only the steam itself freely issue from the nozzle and to introduce the steam within the nests or hiding places of the moths so that the live steam with its high heat content will scald the worms or mass of worms within the nests or hiding places. Sometimes it is desirable to apply hot steam to insects under the bark. Thereafter the desired insecticides under the operator's command may be reintroduced in the steam stream and the work of spraying in the usual manner continued.

It is noted that through the use of the steam the following features, not possible in any other way, are developed:

1. The use of steam to destroy insects, instead of fire heretofore used.

2. The use of high velocity expanding steam to produce a highly atomized emulsion to be applied in a cold zone.

3. The concentrated or diffused action of the stream may be utilized for close-up or distance work as desired, and mixtures may be thoroughly mixed at the point of application.

4. In some instances the catalytic action of the steam may give desired changes to substances used.

5. Quick change from one substance, mixture or form of application to another.

Under proper control and regulation of proportions, the nozzle stream may be made to develop a heavy wet coating, or there may be made a finely divided floating emulsified colloidal mass which floats in the air like a flying mist and gradually settles down permitting treatment of crops in the field, it merely being necessary to operate to the windward of the field and let the wind carry the finely divided mist thereacross.

A list of various germicides and poisons which may be used would be almost unlimited, and would include all sorts of organic and inorganic compounds in simple or complex combinations, and this mode of spraying lends itself readily to the utilization of any substances singly or in any combination, that will be beneficial under the particular circumstances at the time. In its action, this device is unlike spraying devices heretofore used in which it was only possible to mix one kind of a spray and use it in one mode of application at a time, whereas with the present method a plurality of ingredients, which are inert to one another, may be made in one combination and selected in the proportional strengths as required at any instant or eliminated at will without interference with the continuous operation of spraying.

While the case herein as outlined is preferably directed to a portable type of unit as being a most convenient form to handle, than fixed installations, the invention is not so limited, as it is within the scope of this invention to operate a fixed non-portable central power station wherein boilers may be provided for the steam requirements and to pipe the entire area to be sprayed with piping and means for attachment whereby the entire agricultural enterprise may be treated in zones so that all sections thereof may be reached.

Sulfurous acid is a useful combatant against plant pests. For providing sulfurous acid for this purpose, steam superheated in the coil 12 passes through the coil 13 in the interior of the retort to heat sulfur therein unaided or with the help of the fire under the retort, to form sulfur vapor. Said steam discharging under pressure into the retort, provides a pressure therein to discharge a mixture of steam and sulfur vapor through the tube 16 and nozzle to combine with the steam and oxygen of the air to form sulfurous acid for application to plants and other objects.

Flowers of sulfur is a well known useful combatant against plant pests. With this substance, the present device is particularly useful, the pulverulent sulfur being carried up and into the jet of steam and is deposited in the presence of the steam, as the steam is turned into an artificial dew deposited on the vegetation. This sulfur being thoroughly intermixed and intermingled with the condensed vapor in fine colloidal form is carried around and through the foliage and lodged upon the leaves, without at all burning the leaves. After remaining a short period of time exposed to the atmospheric conditions, the sulfur effectually operates against the pests and bacterial diseases against which it is directed. When sulfur is burned in the retort 15 to form sulfur dioxide, steam may be passed through the pipe 11 and the retort to combine with the dioxide to form sulfurous acid to be deposited in the mist of the spray. Heretofore it has not been possible to spray sulfurous acid in any form directly upon foliage without burning the same, but in the above noted form of spraying the leaves are not harmed in any way.

Dry calcium arsenate or other powder may also be fed from the receptacle 24 to the nozzle.

The new device may be also used for introducing poison impregnated blasts of steam into the holes or nests of small animals such as woodchucks, moles, and the like.

One method of operating with oil vapor includes passing steam from the boiler through the coil 12 in the furnace to superheat the steam; thence passing the superheated steam through the coil 13 in the interior of the retort to the fuel oil (the residue after kerosene and naphtha are distilled off) and then discharging said steam under pressure into the retort to provide a pressure therein thereby to employ said pressure and steam to discharge a mixture of steam and oil through the tube 16 and said nozzle for application to plants and other objects.

By another method of operating with oil vapor, the fuel oil is heated to the boiling point in the retort 15. As the tube 16 leading from this retort is passed inside the steam conduit 9 and connected to the nozzle, it is subjected to the suction of the steam passing through the tube 37, and the operator has only one line of hose to handle as the tubes 28 and 43 may be omitted when only oil and steam are used. The steam jacketing of the oil tube prevents a premature condensation of the oil vapor and per contra the steam by absorbing what heat is given off from the oil tube is enabled to reach the spray nozzle at a higher pressure. The vacuum set up in the still by the ejector permits a rapid vaporization at a low temperature, and also the bringing of the oil vapor to the spray nozzle. By these arrangements we get a most efficient method of spraying vapors, and the vapors easily carry 500 yards. Other vapors can be sprayed by the same arrangement, as for example sulfur dioxide by burning sulfur in the retort, or chlorine gas from chloride of lime, acid etc. Gases sprayed by this method will dissolve in water vapor and the condensed water will hold them, where applied, for a longer time than if they were sprayed alone.

Our apparatus is very useful for killing aphides on leaves, using a mixture or mist of oil with steam as provided by any of the processes herein described. This is accomplished by spraying the upper face of the leaves with fine drops of adhesive oil or other colloid sufficiently to entangle and trap the aphides therein, but leaving sufficient uncoated spaces on the leaves between the drops to permit the leaves to breathe and live.

With our apparatus we have also successfully tried out a method for starting new growth and new blooms on apple trees by first killing the leaves thereof; and we apprehend that this same method may have extensive uses with this and other varieties of trees. This method includes spraying the upper face of the leaves with drops of adhesive oil or other colloid sufficiently to cover the entire breathing space of the leaves to prevent the leaves from breathing, thus to cause the leaves to fall, thereby to permit new growth of leaves and blooms. When thus treated, the leaves were browned in a very short time, and after they had fallen and the fruit had been gathered, new leaves and blooms appeared.

Our improved apparatus is also very suitable for applying coloring matter to the flesh side of hides, which should be done at a temperature of about 140° F., which the air brush has been unable to maintain. By the use of our nozzle the steam passing through the nozzle draws the coloring matter into the nozzle, thereby to mix the coloring matter with the steam to warm the coloring matter to about 140° F. and form it into a fine spray, which is directed to the flesh side of the hides.

We claim:

1. A method of the class described consisting in liberating a blast of steam into free air, and introducing into said blast an insecticide including an oily liquid and a dry material.

2. A method of the class described consisting in liberating a blast of steam into free air and introducing into said blast an insecticidal liquid and sulfur.

3. A method of treating vegetation consisting in liberating a blast of steam and introducing into said steam in transit an insecticide including an oil, and sulfur.

4. A method of treating vegetation consisting in liberating a blast of hot vapor into free air and introducing into said blast an insecticide including an oil and a dry material rendered molten during transit of said blast and becoming dry when applied.

5. A method comprising generating a blast of hot vapor, introducing an insecticide including sulfur and oil into said blast to form a floating mist, and directing said blast to the windward side of an extensive area of vegetation to permit the said mist to be blown over said area.

6. A method of treating an extensive area of vegetation infested with insects, bacteria or fungi consisting in first subjecting an insecticide including an oil, and a dry material, detrimental to said insects, bacteria or fungi to the action of a blast of steam at a pressure sufficient to form a fog-like mist of said material and oil, and liberating said fog-like mist over said extensive area of vegetation whereby said mist settles over said area and envelops said vegetation thereby destroying said insects, bacteria or fungi without deleterious effect on said vegetation.

7. A method of treating vegetation infested with insects, bacteria or fungi consisting in first subjecting an insecticide including sulfur to the action of a blast of hot vapor at a pressure sufficient to form a fog-like mist of said sulfur, and then directing said fog-like mist over said infested vegetation whereby said mist settles upon said vegetation and completely envelops said vegetation without interfering with the breathing of the leaves thereof.

8. A method comprising forming a blast of steam, introducing an insecticide including a finely divided dry insecticide and an oil into said blast to form a floating fog-like mist, and liberating said mist over extensive areas of vegetation.

9. A method of killing insects on leaves, said method including enveloping said leaves in a steam-created fog-like mist including finely divided particles of oily adhesive and sulfur sufficiently close together to entangle said insects but leaving sufficient space to permit the leaves to breathe.

10. A method of treating a tract of pest-infested vegetation consisting in liberating a blast of steam into free air, introducing into said steam an insecticide including a suspended dry material detrimental to said pests whereby a tenuous, fog-like mist is formed of said dry material capable of floating long distances before settling, and liberating said fog-like mist over said tract whereby said mist floats over, settles upon and envelops said vegetation in such a manner as to exterminate said pests.

11. A method of treating pest-infested vegetation which consists in enveloping vegetation in a steam-created fog-like mist of oily liquid and sulfur in which said sulfur is present in the form of finely subdivided particles, and liberating said mist over said vegetation whereby said mist settles upon, and envelops said vegetation in such a manner that the sulfur particles exterminate said pests without interfering with the breathing spaces of the vegetation.

12. A method comprising forming a blast of hot vapor, introducing into said blast an insecticide including an insecticidal dry material and an adhesive insecticidal oil having a boiling point higher than the liquid of said hot vapor and difficult to evaporate under ordinary atmospheric conditions, thereby to form a tenuous fog-like mist composed of fine particles of vapor, dry material and oil, unconfinedly liberating said mist over infested plants whereby said mist floats over, settles upon and envelops said plants and leaves fine particles of oil and dry material on the plants.

13. A method of treating an extensive tract of pest-infested vegetation consisting in liberating a blast of steam into free air, introducing into said steam a liquid and a dry material detrimental to said pests whereby a tenuous, fog-like mist is formed of said steam and materials capable of floating long distances before settling, and liberating said fog-like mist over said tract whereby said mist floats over, settles upon and envelops said vegetation in such a manner as to exterminate said pests.

14. A method of treating pest-infested vegetation consisting in liberating a blast of steam into free air, and introducing an oil and a dry material into said steam whereby said oil, dry material and moisture from said steam are liberated into the air as a fog-like mist.

15. A method of treating a tract of pest infested vegetation consisting in liberating a blast of steam into free air, introducing into said steam at the point of liberation thereof a non-gasified material detrimental to said pests, whereby a tenuous, fog-like mist is formed of said steam and material capable of floating long distances before settling, and liberating said fog-like mist over said tract whereby said mist floats over, settles upon, and envelops said vegetation in such a manner as to exterminate said pests.

16. A method comprising directing a blast of steam into free air, introducing finely divided insecticide into said steam to form an insecticidal mist sufficiently divided in a fine state to float long distances, and liberating said mist over large areas of vegetation.

17. A method of treating a tract of pest infested vegetation consisting in liberating a stream of steam at high velocity into free air and simultaneously therewith introducing into and mixing in transit in said stream of steam substantially at the point of liberation thereof non-gasified pest-destructive material whereby said material is so completely atomized that a fog-like mist is formed of said steam and material capable of floating long distances before settling, and directing said fog-like mist over said tract whereby said mist floats over, settles upon and envelops said vegetation on said tract in such a manner as to exterminate said pests.

18. A method of the class described consisting in liberating a blast of hot vapor into free air, and introducing into said blast an insecticide including an oily liquid and a dry material rendered molten during transit of said blast and becoming dry when applied.

19. A method comprising liberating a blast of hot vapor into free air and introducing into said blast a dry material, rendered molten during transit of said blast and becoming dry when applied.

20. A method comprising liberating a blast of hot vapor into free air, and introducing into said blast an insecticidal liquid and a dry material, rendered molten during transit of said blast and becoming dry when applied.

Signed at New York in the county of New York and State of New York this 30th day of November A. D. 1923.

JOHN E. SHEPHERD.
EDWIN K. O'BRIEN.